(12) United States Patent
Swamy et al.

(10) Patent No.: US 8,015,068 B2
(45) Date of Patent: Sep. 6, 2011

(54) SYSTEMS AND METHODS FOR MANAGING ORDERS MADE VIA A COMPUTER NETWORK

(75) Inventors: Sanjana Swamy, Aurora, IL (US); Karen S. Holtman, Grayslake, IL (US); Arnold S. Eroles, Hobart, IN (US); James Yu, Glenview, IL (US); Robert Mills, Chicago, IL (US); Daniel Levine, New York, NY (US); Jim Huppert, Crystal Lake, IL (US); Daniel S. Grimm, Chicago, IL (US); Shailesh Prakash, Schaumburg, IL (US)

(73) Assignee: Sears Brands, LLC, Hoffman Estates, IL (US)

( * ) Notice: Subject to any disclaimer, the term of this patent is extended or adjusted under 35 U.S.C. 154(b) by 136 days.

(21) Appl. No.: 12/539,219

(22) Filed: Aug. 11, 2009

(65) Prior Publication Data
US 2011/0040651 A1   Feb. 17, 2011

(51) Int. Cl.
*G06Q 30/00* (2006.01)
(52) U.S. Cl. .......................... 705/26; 705/27
(58) Field of Classification Search ............... 705/26.1, 705/27.1, 26, 27
See application file for complete search history.

(56) References Cited

U.S. PATENT DOCUMENTS

| | | | |
|---|---|---|---|
| 6,439,345 B1 | 8/2002 | Recktenwald et al. | |
| 6,871,184 B1 | 3/2005 | Liberman | |
| 6,928,415 B1 | 8/2005 | Liberman | |
| 7,124,098 B2 | 10/2006 | Hopson et al. | |
| 7,257,552 B1 * | 8/2007 | Franco | 705/28 |
| 7,431,555 B2 | 10/2008 | Liberman | |
| 2003/0105555 A1 * | 6/2003 | Lunak et al. | 700/237 |
| 2003/0177072 A1 * | 9/2003 | Bared | 705/26 |
| 2007/0150375 A1 * | 6/2007 | Yang | 705/26 |

OTHER PUBLICATIONS

"The case for WMS", Hill, John M. Modern Materials Handling. Boston: Dec. 1996. vol. 51, Iss. 15; p. W4, downloaded from ProQuestDirect on the Internet on Jun. 15, 2011, 5 pages.*

* cited by examiner

*Primary Examiner* — James Zurita
(74) *Attorney, Agent, or Firm* — Greenberg Traurig, LLP

(57) ABSTRACT

A system and method for allowing a user to schedule pickup of an ordered item provides a user interface having user interface elements for allowing a user to specify a frequency with which an order is it to be picked up, for informing a user as to availability of the item for pickup, and/or for allowing a user to request that an item be held in reserve for pickup within a given period of time, such as 24 hours. Frequency options provided to the user for selection when scheduling an order for pickup may include a one-time frequency, a daily frequency, a weekly frequency, a monthly frequency, and user specified dates. The information as to availability of the item for pickup is determined considering a time of order and real-time stocking information for the item.

8 Claims, 19 Drawing Sheets

Store Pickup Information

Your Selected Store

This is where you will be picking up your order.

JOLIET - MY GOFER
2700 PLAINFIELD RD
JOLIET, IL 60435
(815)-436-4018

See store pickup information

When will be my order be ready for pickup?

Your order is ready for pickup NOW.

☐ Get it NOW.

☐ 24hold Eligible Ready for pick up.

○ Pay Online   ● 24hold (Pay In-Store) What's this?

Note: Your 24hold reservation will expire in 24 hours if the order is not paid.

Add a new address »

Contact Information  Why is this needed?

[ Chicago IL 60657 ]

Item

Magellan Roadmate 1412, 4.3 in. Touchscreen
GPS Navigation System
Item # 05710605000

Quantity: 1  Edit
Price: $199.99
Total: $199.99

---

Order Summary

Magellan Roadmate 1412, 4.3
in. Touchscreen GPS
Navigation System
Qty: 1

Add replacement coverage on
products –3 years on Craftsman
and Kenmore, and 2 years on all
other brands.

Item Total:                $229.99

Subtotal:                  $229.99
Sales Tax:                  $18.38
Order Total:           $248.37

Additional discounts may apply.

Place your Order and Pay at
Store. What's This?

[ 24hold ]

---

1702 — Order Summary
1704 — Store address
1706 — When will my order be ready for pickup?
1708 — Pay Online / 24hold
1710 — Note
1712 — 24hold Eligible

SYSTEMS AND METHODS FOR MANAGING ORDERS MADE VIA A COMPUTER NETWORK

BACKGROUND

The subject invention generally relates to systems and methods for ordering items via a computer network and, more particularly, relates to systems and methods for scheduling orders for pickup, managing scheduled orders, and/or for facilitating the placing on hold of ordered items at a pickup location.

In the art, systems and methods for ordering items via a computer network are generally known. For example, U.S. Pat. No. 7,124,098 discloses a system and method for online shopping that permits a customer to submit online orders for items from a store that serves both walk-in and online customers. The system and method provides an order cutoff time and an associated delivery window for items selected by a customer and accepts a customer's submission of a purchase order for an item if the time of submission is before the order cutoff time for that item. Similarly, U.S. Pat. Nos. 7,431,555; 6,928,415; and 6,871,184 each disclose a system and method for delivering items purchased over the Internet where items ordered by a particular time in the early evening are delivered by the next morning to a location that is within a 5-6 hour delivery radius of a stocking warehouse.

While the systems and methods disclosed in these exemplary patents, which are incorporated herein by reference in their entirety, generally work for their intended purpose, the subject invention provides improvements thereto, particularly by providing a consumer with the ability to schedule orders for pickup, manage scheduled orders, and/or request that a desired item be placed on hold at a pickup location.

SUMMARY OF THE INVENTION

The following generally describes systems and methods for managing orders for items made via a computer network, i.e., online. Generally, the described system and method provides a user interface having user interface elements for allowing a user to specify a frequency with which an order is it to be picked up, for informing a user as to availability of the item for pickup, and/or for allowing a user to request that an item be held in reserve for pickup within a given period of time, such as 24 hours. Frequency options provided to the user for selection when scheduling an order for pickup may include a one-time frequency, a daily frequency, a weekly frequency, a monthly frequency, and user specified dates. The information as to availability of the item for pickup is determined considering a time of order and real-time stocking information for the item.

While the forgoing provides a general explanation of the subject invention, a better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the subject invention, reference may be had to preferred embodiments shown in the attached drawings in which:

FIG. 5 illustrates an exemplary interface for scheduling a one-time pickup order;

FIG. 7 illustrates an exemplary interface for scheduling a weekly, recurring order;

FIG. 9 illustrates an exemplary interface for scheduling specific day orders;

FIGS. 10 and 11 illustrate an exemplary search results page providing access to functionality for scheduling an order;

FIGS. 17 and 18 illustrate an exemplary interface for scheduling a product hold;

FIG. 19 illustrates an exemplary previous order detail page for a user showing order status including a product hold.

DETAILED DESCRIPTION

Figure 1:
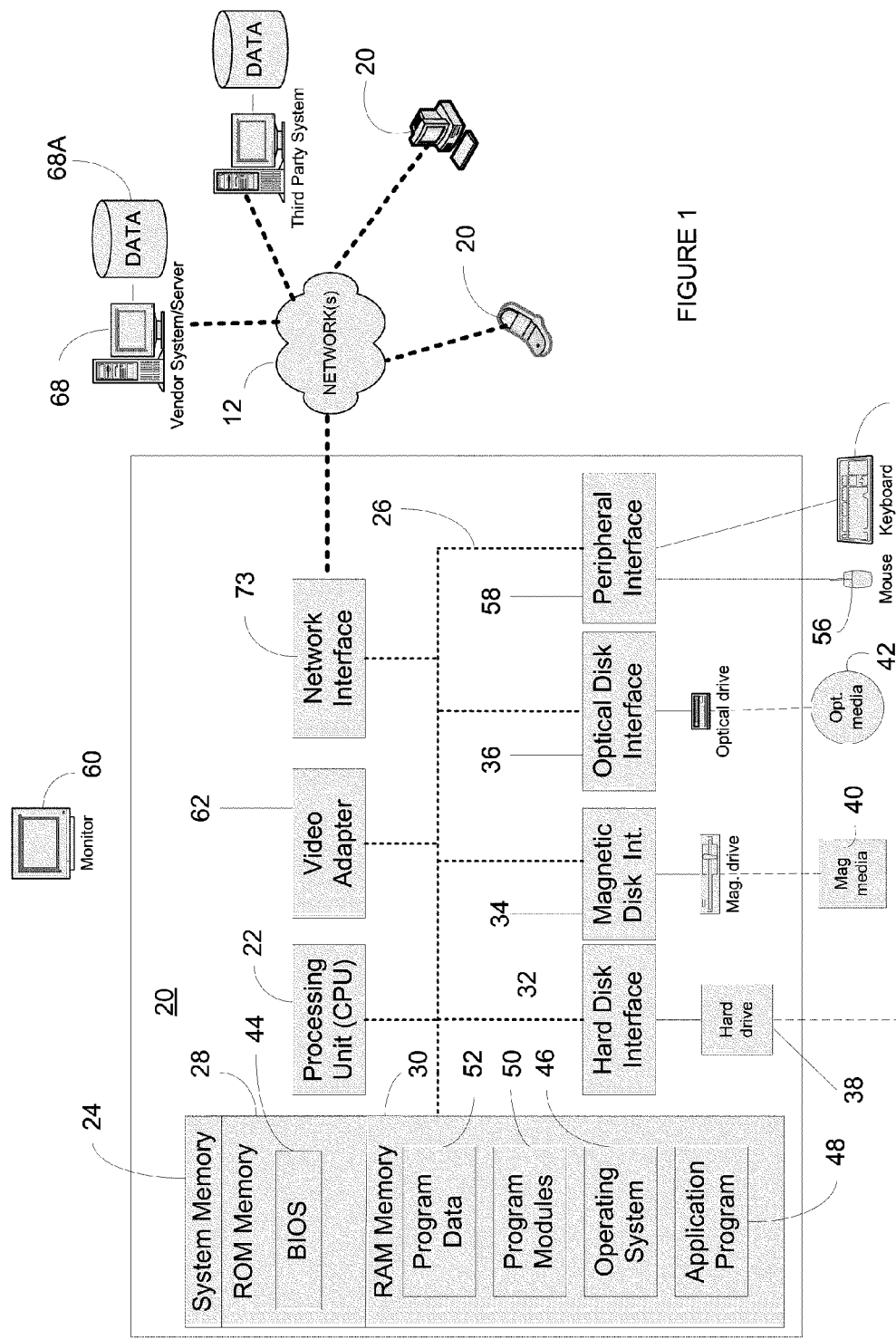
FIG. 1 illustrates in block diagram form components of an exemplary, online, retail, computer network environment.

With reference to the figures, the following describes various systems and methods for managing orders made via a computer network. To this end, a processing device 20, illustrated in the exemplary form of a computer system, is provided with executable instructions to, for example, provide a means for a consumer, i.e., a user, to access a vendor system server 68 and, among other things, order items, schedule and/or manage delivery of ordered items, schedule and/or manage pick-up of ordered items, and/or request that ordered items be placed on hold at a retail establishment. Generally, the computer executable instructions reside in program modules which may include routines, programs, objects, components, data structures, etc. that perform particular tasks or implement particular abstract data types. Accordingly, those skilled in the art will appreciate that the processing device 20 illustrated in FIG. 1 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted, the processing device 20 may also utilize logical connections to one or more remote processing devices, such as the vendor system server 68 having associated data repository 68A. In this regard, while the vendor system server 68 has been illustrated in the exemplary form of a computer, it will be appreciated that the vendor system server 68 may, like processing device 20, be any type of device having processing capabilities. Again, it will be appreciated that the vendor system server 68 need not be implemented as a single device but may be implemented in a manner such that the tasks performed by the vendor system server 68 are distributed amongst a plurality of processing devices/databases located at different geographical locations and linked through a communication network. Additionally, the vendor system server 68 may have logical connections to other third party systems via the network 12 and, via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the vendor system server 68 may include many or all of the elements described above relative to the processing device 20. In addition, the vendor system server 68 would generally include executable instructions for, among other things, making items available for purchase, handling search requests, providing search results, accessing pricing information related to items, accessing inventory and item availability data, providing a means for the user to schedule and/or manage orders for delivery and facilitating any such delivery of ordered items, providing a means for a user to schedule and/or manage orders for pickup and facilitating any such pickup of ordered product, and/or providing a means for a user to request that ordered product be placed on hold at a retail establishment and facilitating any such hold request. Communications between the processing device 20 and the vendor system server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the vendor system server 68.

Figure 2:
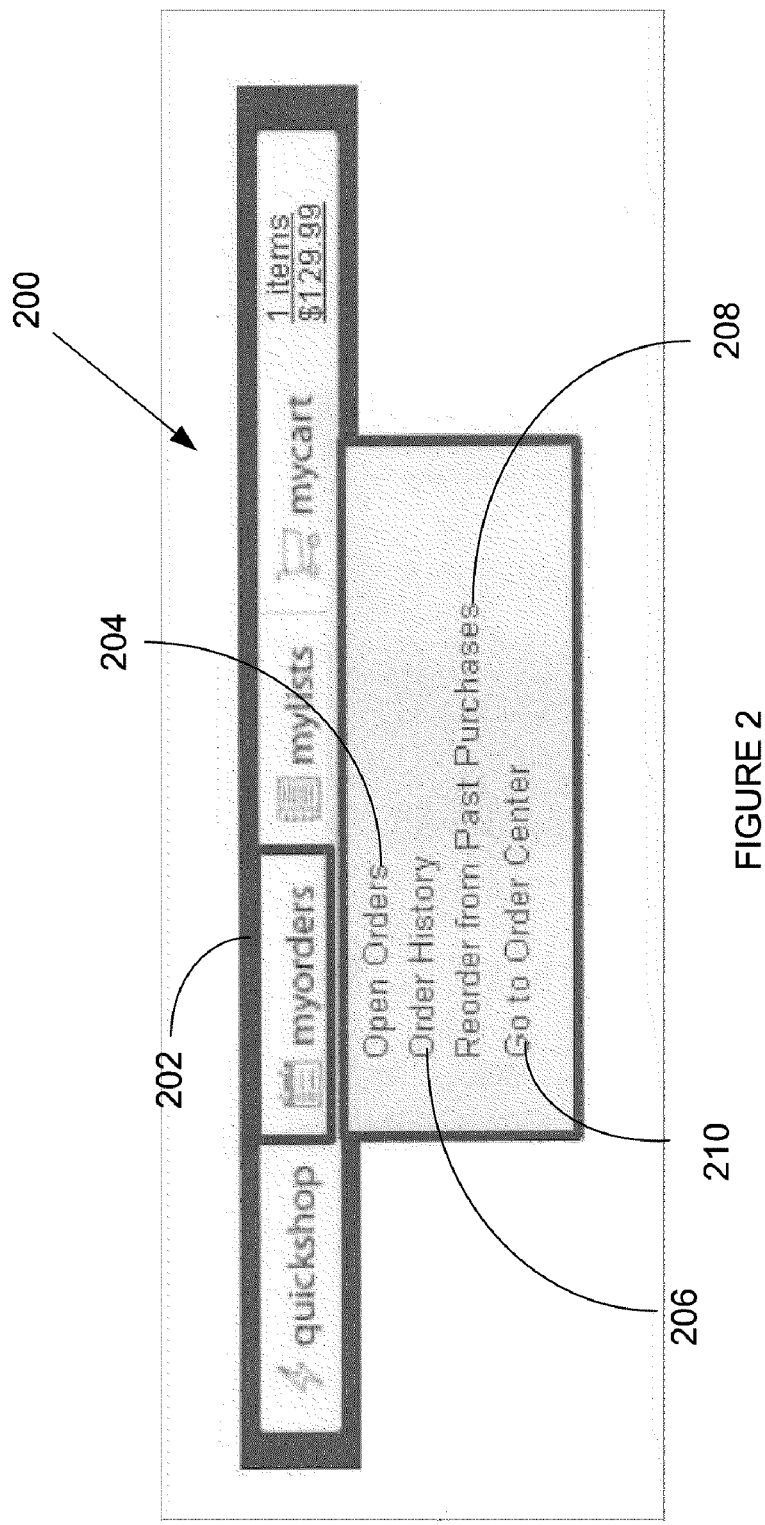
FIG. 2 illustrates an exemplary task bar for use in accessing functionality provided by the subject invention.
Figure 3:
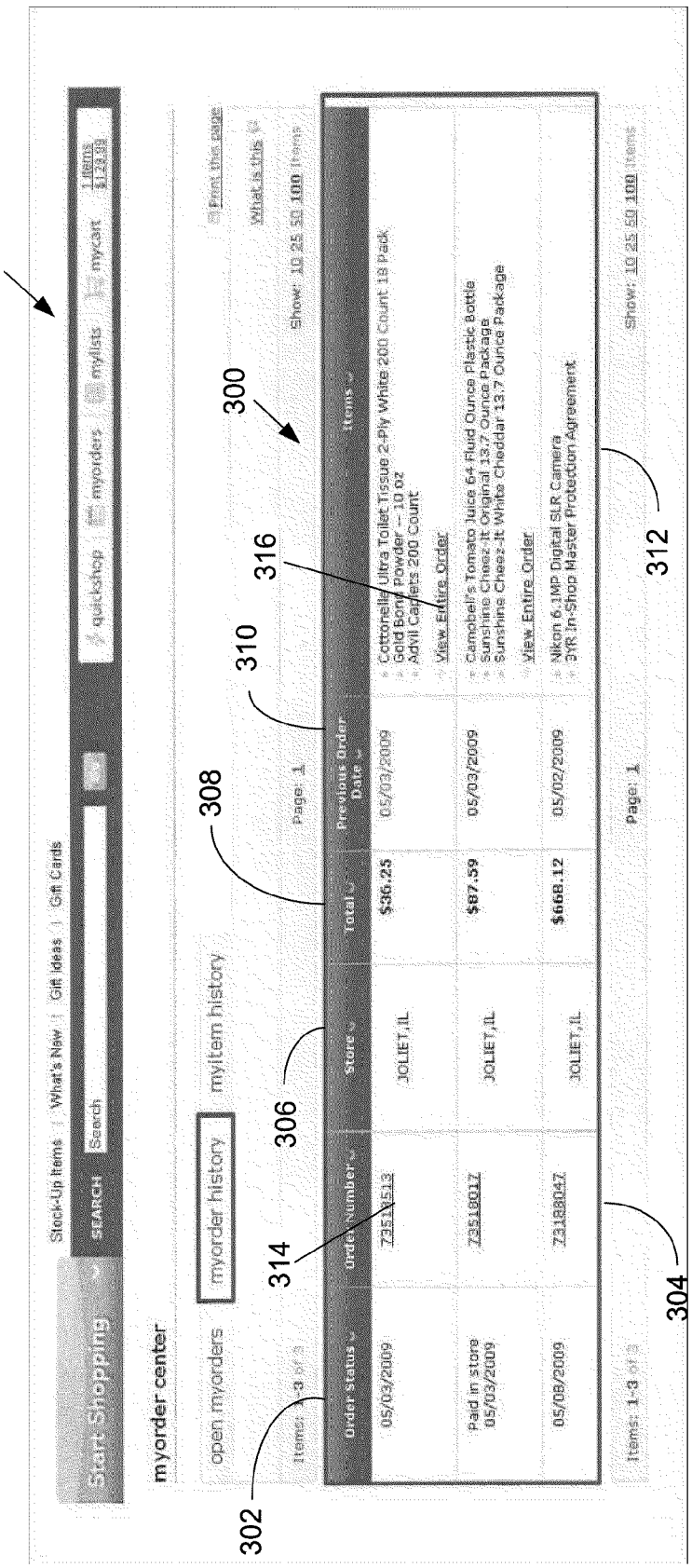
FIG. 3 illustrates an exemplary prior purchasing page for a user.

For allowing a user to setup and/or manage scheduled orders, the vendor server system 68 may make available to the user one or more tools by which a user can, for example, view past orders, view open orders, reorder from past orders, schedule orders for pickup, manage recurring or otherwise open orders, etc. While not required, these various tools may be made available to the user via a task bar 200, an example of which is illustrated in FIG. 2. The task bar 200 may be presented to a user as a component part of a home page or other web page (as illustrated in FIG. 3), may be in the form of a pop-up menu, or the like without limitation. In the illustrative example, at least some of the aforementioned tools may be accessed by a user expanding the menu item "myorders" 202 and by then selecting one of the corresponding menu sub-items "open orders" 204, "order history" 206, "reorder from past purchases" 208, and "go to order center" 210. It will be appreciated that, in this illustrated example, the user will be recognized by the system, e.g., the user has logged-into the system, and will accordingly be provided with the tools and/or information that are appropriate for that user.

In the event that the user selects the "reorder from past purchases" menu sub-item 208, the system will present to the user a listing of that user's prior purchasing/ordering history which the user can further interact with to, for example, manage existing open orders and/or schedule further orders for pickup. As illustrated in FIG. 3, the prior purchasing/ordering history for a user may be presented to the user in a table 300 having sortable columns that provide to the user information relevant to previously made orders/purchases such as "order status" 302, "order number" 304, "store" 306, "total" 308, "previous order date" 310, and "items" 312. The information included in the table may be in the form of links, e.g., order number links 314 or "view entire order" links 316, which the user can select to get access to further details concerning a prior purchase/order of interest. By way of example, in the event that the user selects the order number link 314 labeled "73518513" or the "view entire order link" 316 associated with, i.e., in the same row as, order number "73518513" the user will be presented with details concerning that particular order as illustrated in FIG. 4.

Figure 4:
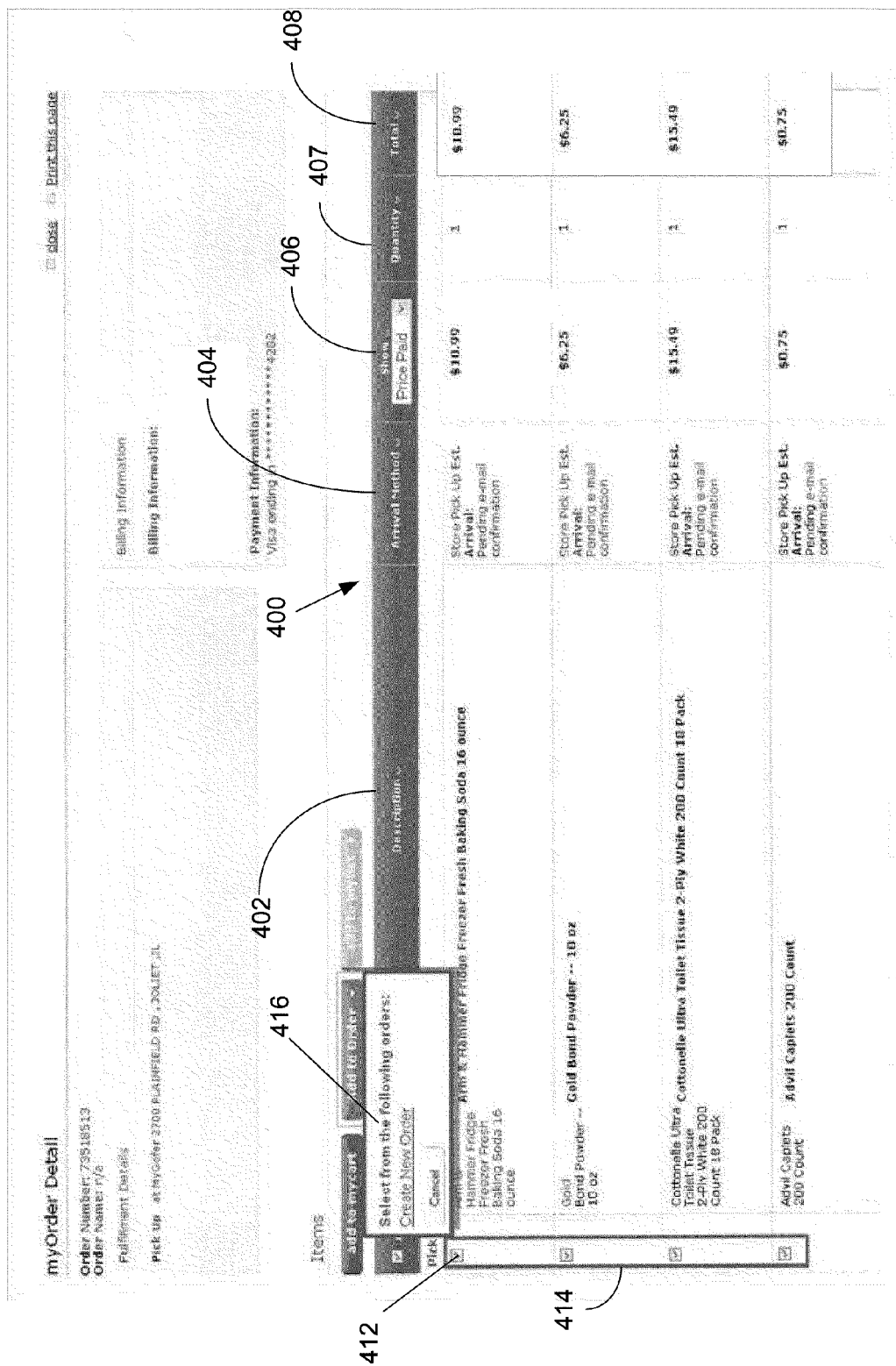
FIG. 4 illustrates an exemplary previous order detail page for a user.

Turning to FIG. 4, the order details provided to the user in response to the user requesting access to such details is preferably presented to the user on an item by item basis. To this end, the details relevant to each item included in a particular order may again be presented to the user in a table 400 having sortable columns where the information for each item may include a "description" of the item 402, the "arrival method" for the item 404, the "price paid" for the item 406, the "quantity" of the item ordered 408, and the "total" paid for that item/quantity requested 410. In addition, the table 400 may include a column 414 having selection icons 412, e.g., check boxes, by which the user may indicate a desire to have select one(s) of the items from the currently being viewed order added to a new (or currently pending) scheduled order as selected by the user via interaction with user interface element 416.

Figure 5:
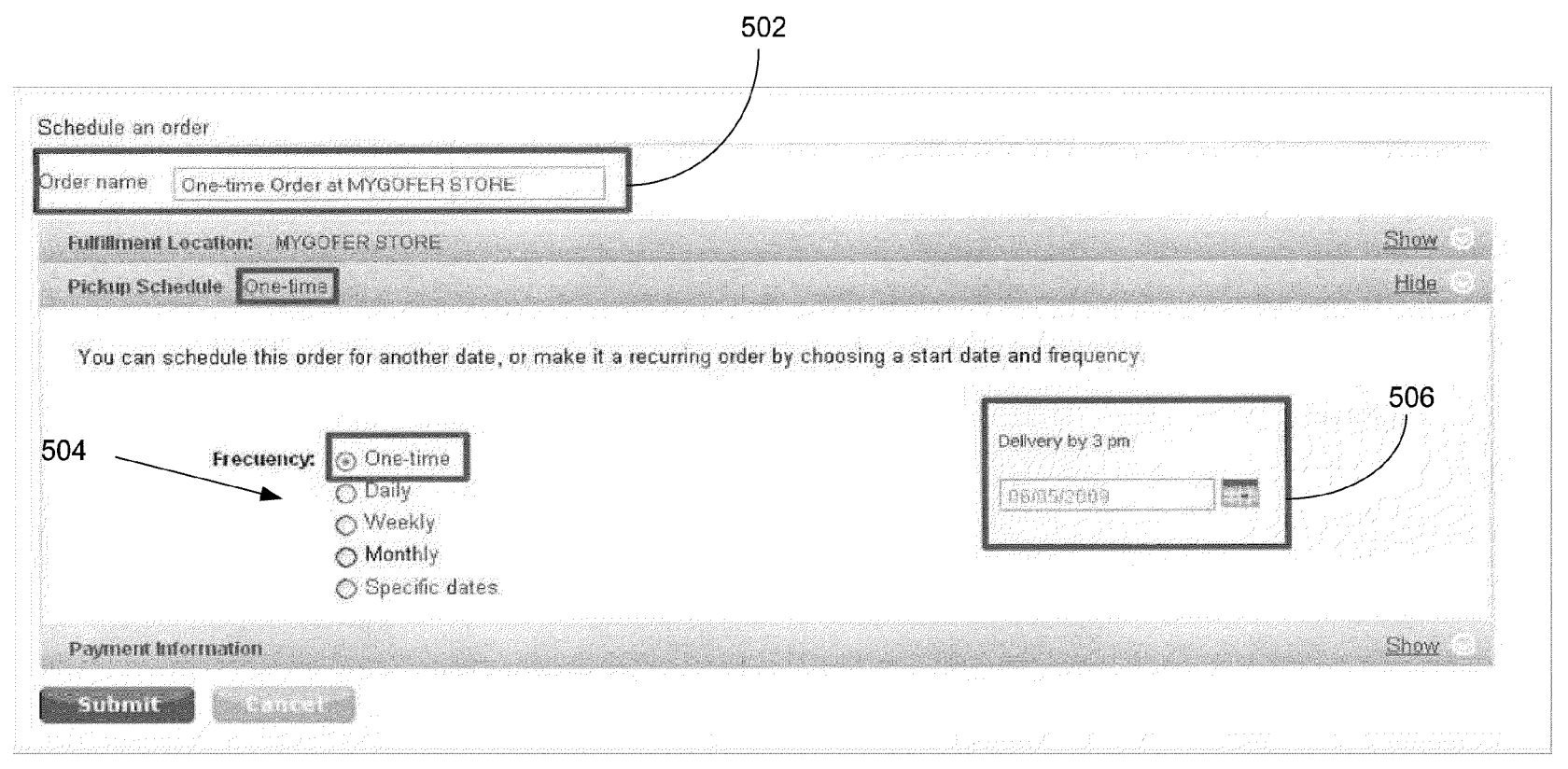

Once a user has created an order for items, which may include items conveniently selected from previously placed orders as discussed above, the user is provided with a user interface by which the user can manage a schedule for the order. By way of example, FIG. 5 illustrates a user interface by which the user can provide a label 502 to the created order (to thereby allow the user to relocate and reuse the order as desired) as well as choose from time options 504 made available for scheduling the order for pickup. As particularly illustrated in FIG. 5, an order can be scheduled as a one-time order, as a recurring order, e.g., recurring daily, weekly, or monthly, or as an order to be fulfilled on specified dates. If multiple locations are available for order pickup, the user may additionally be provided with the ability to specify the desired pickup location. In addition, the user may be presented with a time 506 by which the order will be ready for pickup. As will be described in greater detail below, the time by which an order will be ready for pickup is determined by the order time and by the system accessing real-time information concerning availability/stocking locations of the items included within the order. As will be further appreciated, once an order is finalized, the vendor system server 68 will notify other systems within the network as needed to thereby meet any requirements for that order.

Figure 6:
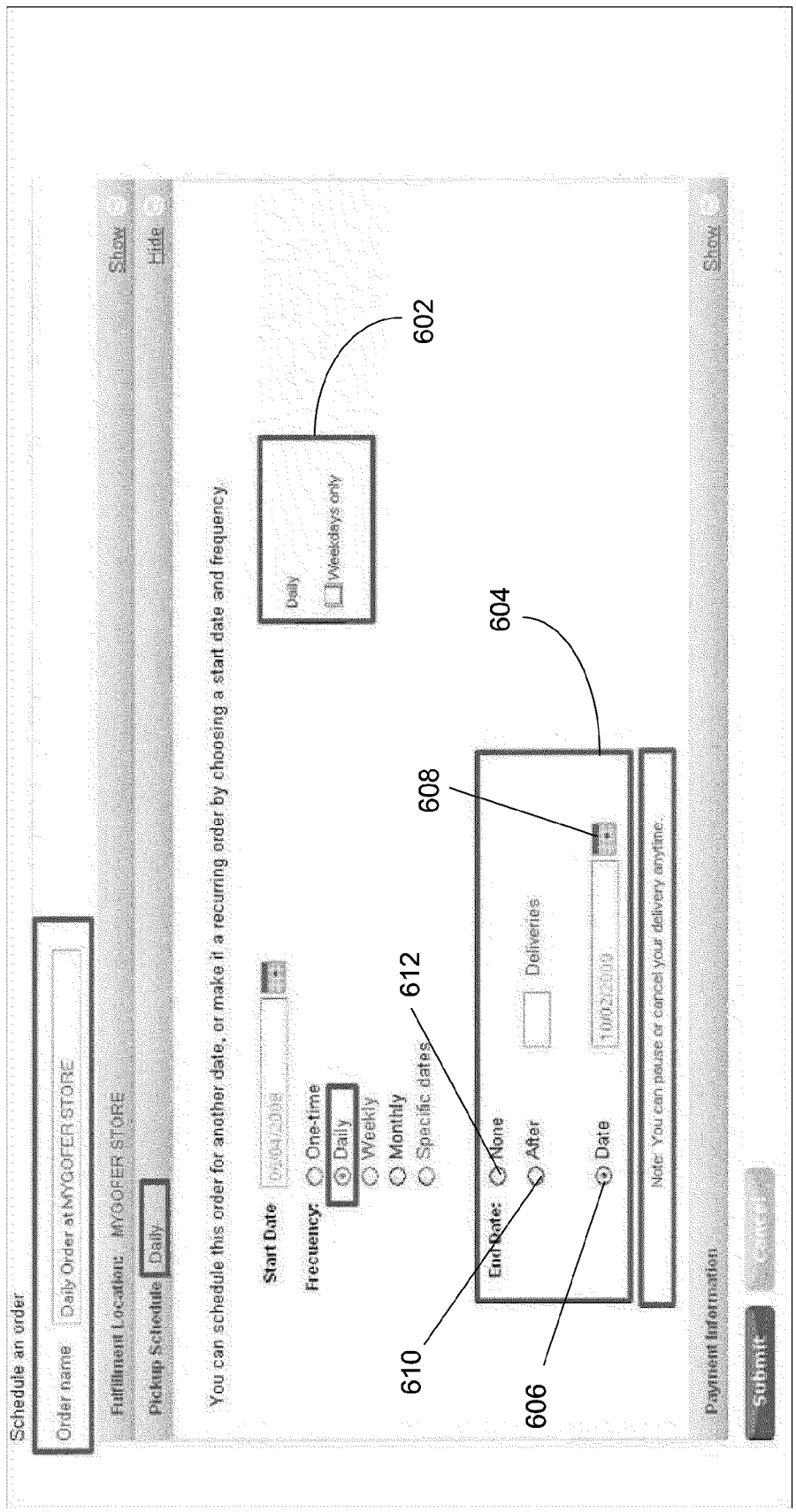
FIG. 6 illustrates an exemplary interface for scheduling a daily, recurring order.

Considering now the case where a user desires to schedule an order for daily, recurring pickup, the system will provide a user interface with elements appropriate for allowing the user to manage that order. For example, as illustrated in FIG. 6, the user may be provided with a user interface element 602 whereby the user may schedule a daily, recurring pickup order for weekdays only or for every day of the week. Similarly, via user interface element 604, the user may specify an end date for a daily recurring order, e.g., by checking box 606 and selecting an end date via calendar 608, specify that a daily recurring order is to be terminated after a specified number of deliveries of items to the location specified for pickup 610, or specify that no end date is currently contemplated 612 for a daily recurring order.

Figure 7:
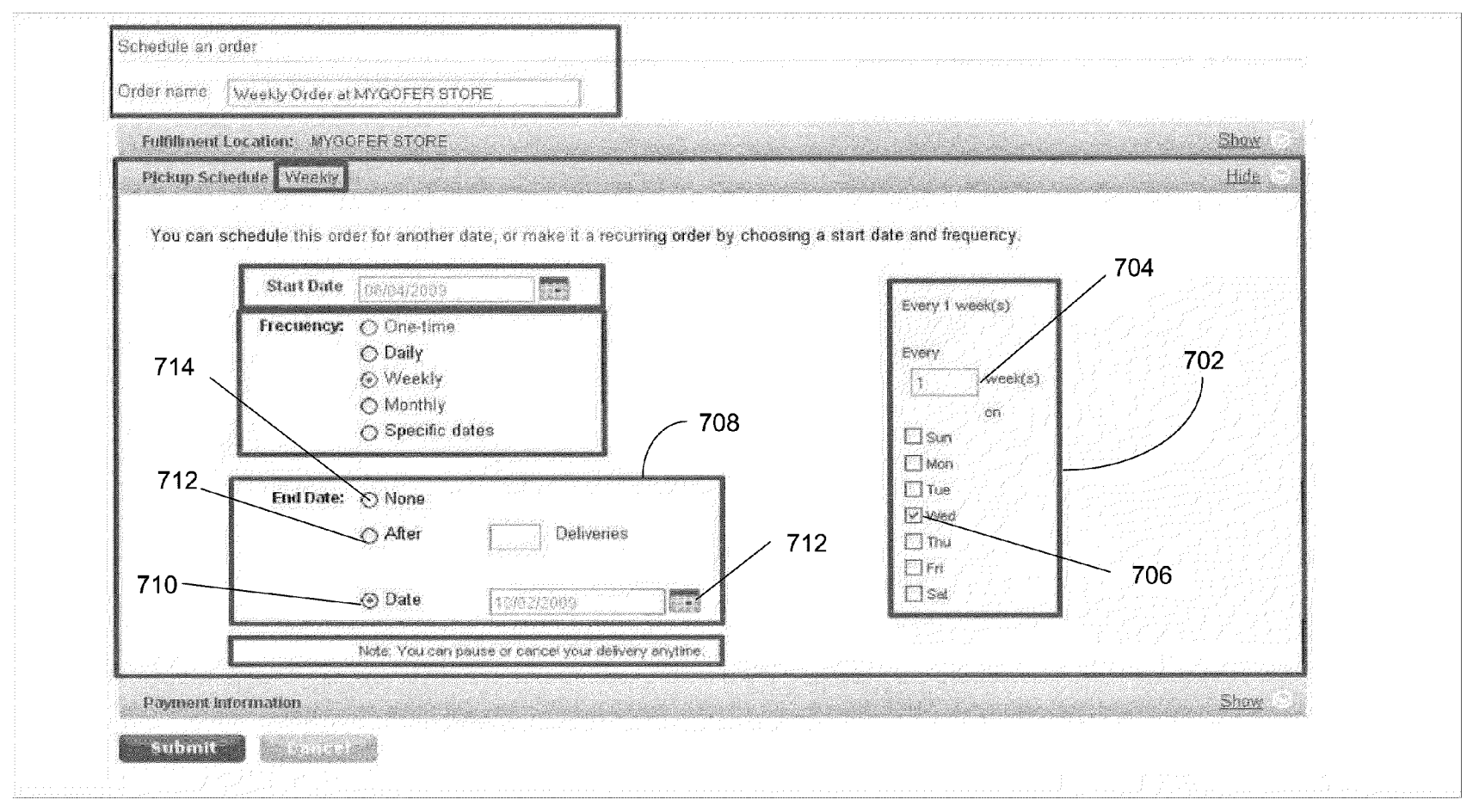
Figure 8:
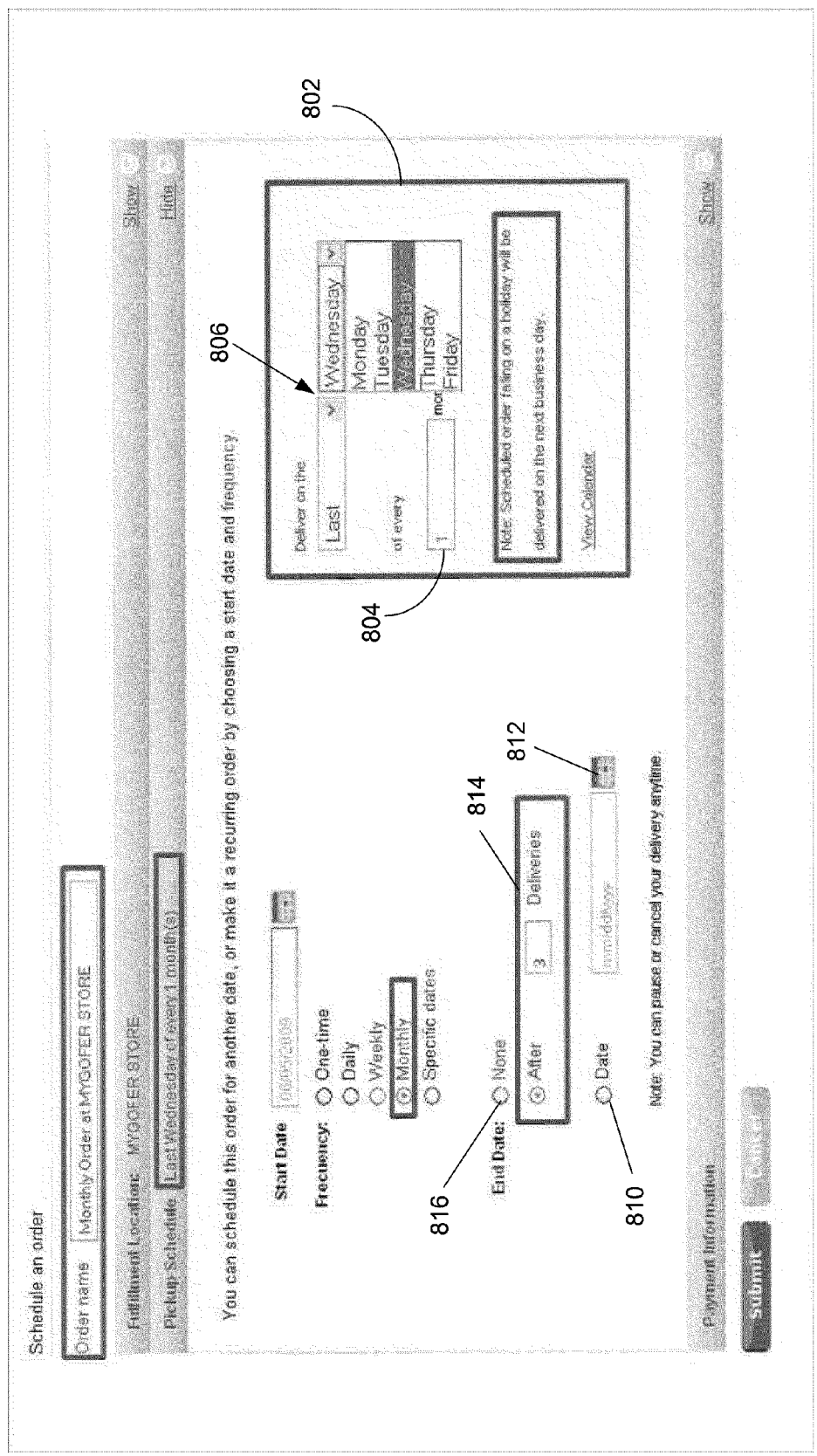
FIG. 8 illustrates an exemplary interface for scheduling a monthly, recurring order.

It will be appreciated that the system may make available similar user interfaces to allow the user to setup and manage weekly or monthly recurring orders. For example, as illustrated in FIG. 7, the user may be provided with a user interface element 702 whereby the user may schedule a frequency of 704 and a desired delivery day of the week 706 for a weekly recurring order and a user interface element 708 by which the user may specify an end date for a weekly recurring order, e.g., by checking box 710 and selecting an end date via calendar 712, specify that a weekly recurring order is to be stopped after a specified number of deliveries of the ordered items to the location specified for pickup 714, or specify that no end date is currently contemplated 716 for a weekly recurring order. Likewise, as illustrated in FIG. 8, the user may be provided with a user interface element 802 whereby the user may specify an order frequency 804 and a desired delivery day of the month 806 for a monthly recurring order and a user interface element 808 by which the user may specify an end date for a monthly recurring order, e.g., by checking box 810 and selecting an end date via calendar 812, specify that a monthly recurring order is to be stopped after a specified number of deliveries of the ordered items to the location specified for pickup 814, or specify that no end date is currently contemplated 816 for a weekly recurring order.

It is to be additionally noted that, via these user interface elements, a user can also pause, cancel, or otherwise change a scheduled, recurring order at anytime.

Figure 9:
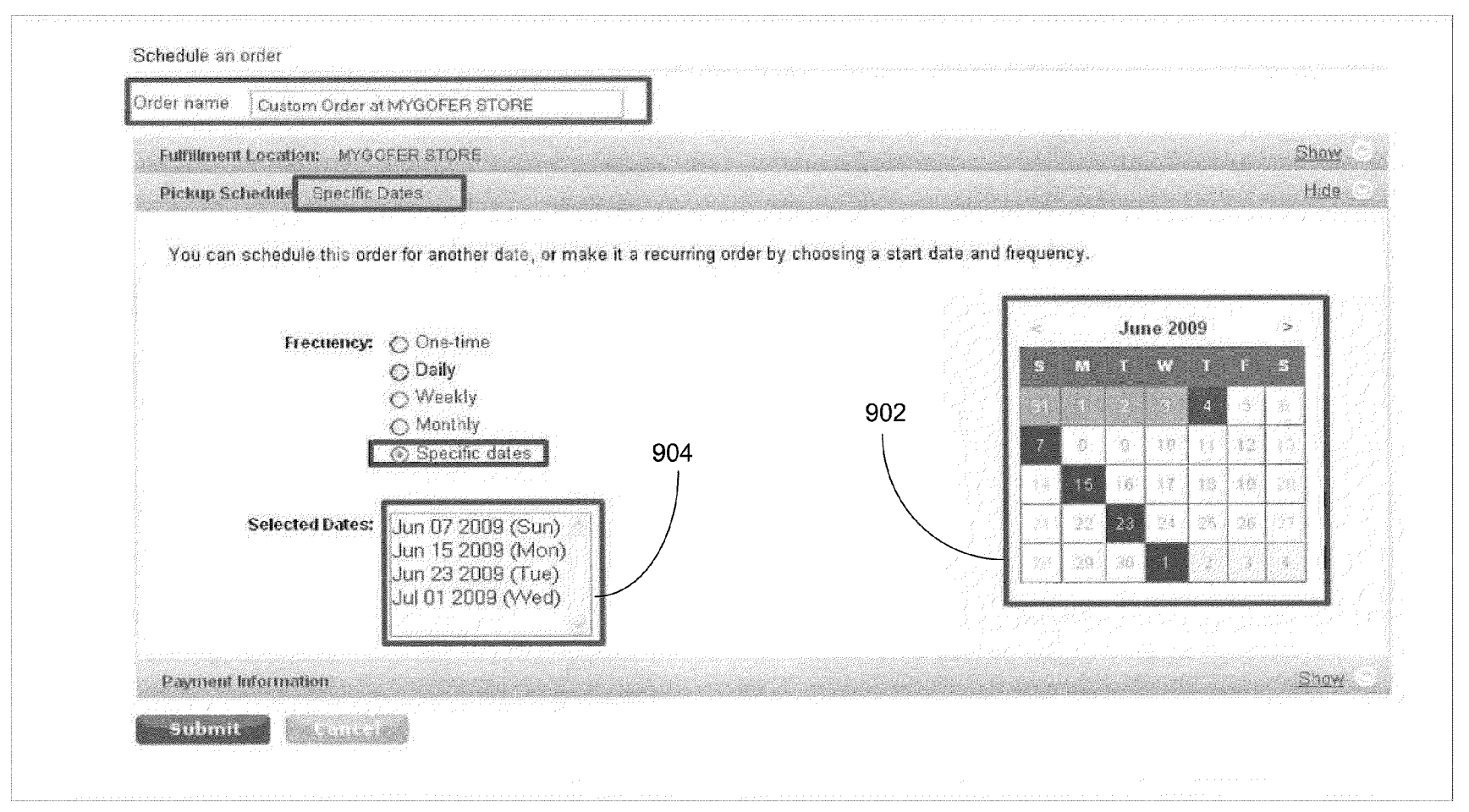

In addition to allowing a user to specify an order for one-time or recurring pickup, the system may also provide a user with the ability to specify specific dates that an order is to be made available for pickup. To this end, as illustrated in FIG. 9, the user may be provided with a user interface element 902, such as a calendar, whereby the user may select the dates that the order is to be fulfilled. The dates selected by the user via interactions with the user interface element 902 may be reflected in a further user interface element 904. In this manner, dates selected via the calendar may be clearly spelled out for the user as seen in the example illustrated.

Figure 10:
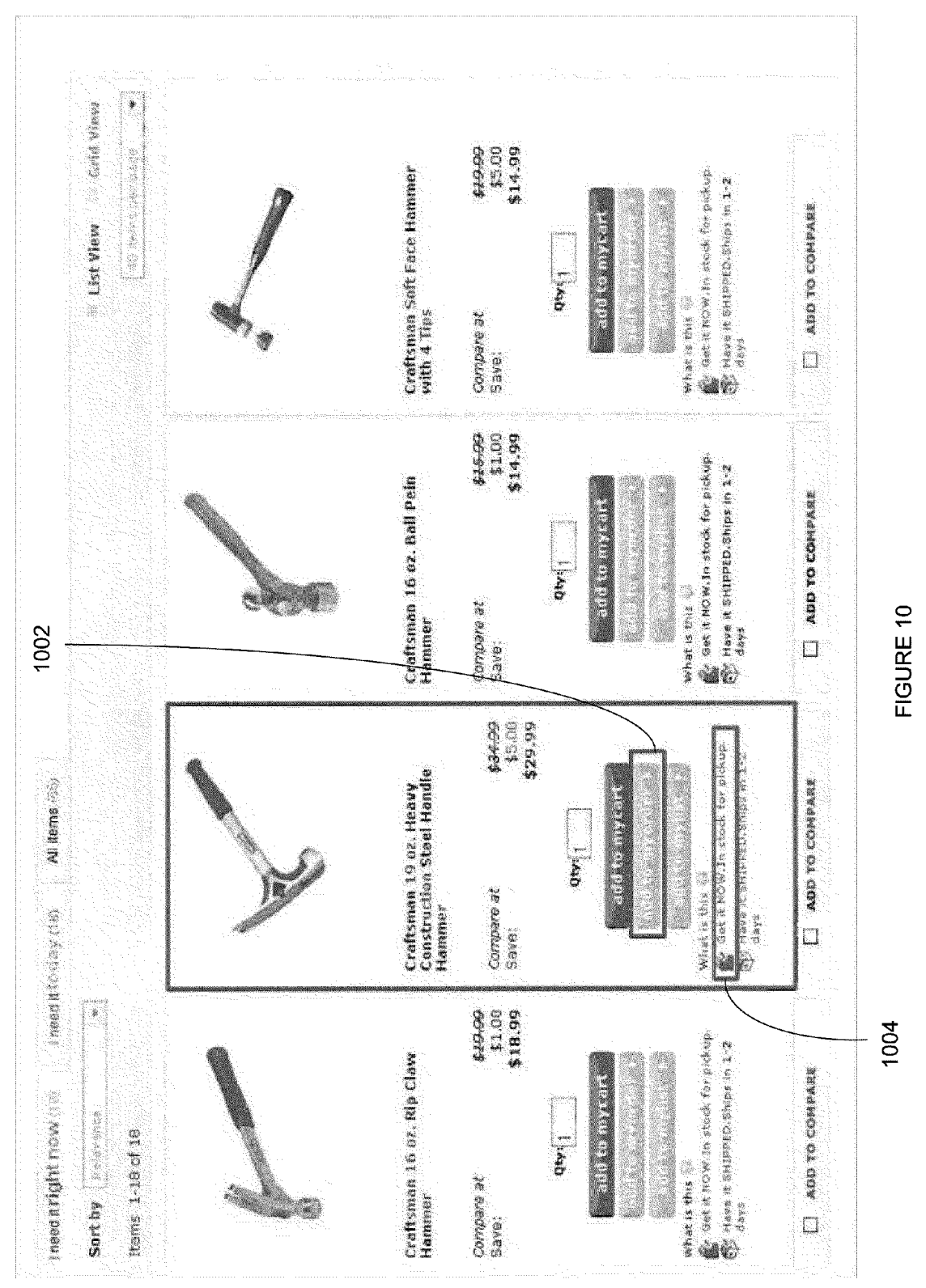
Figure 11:
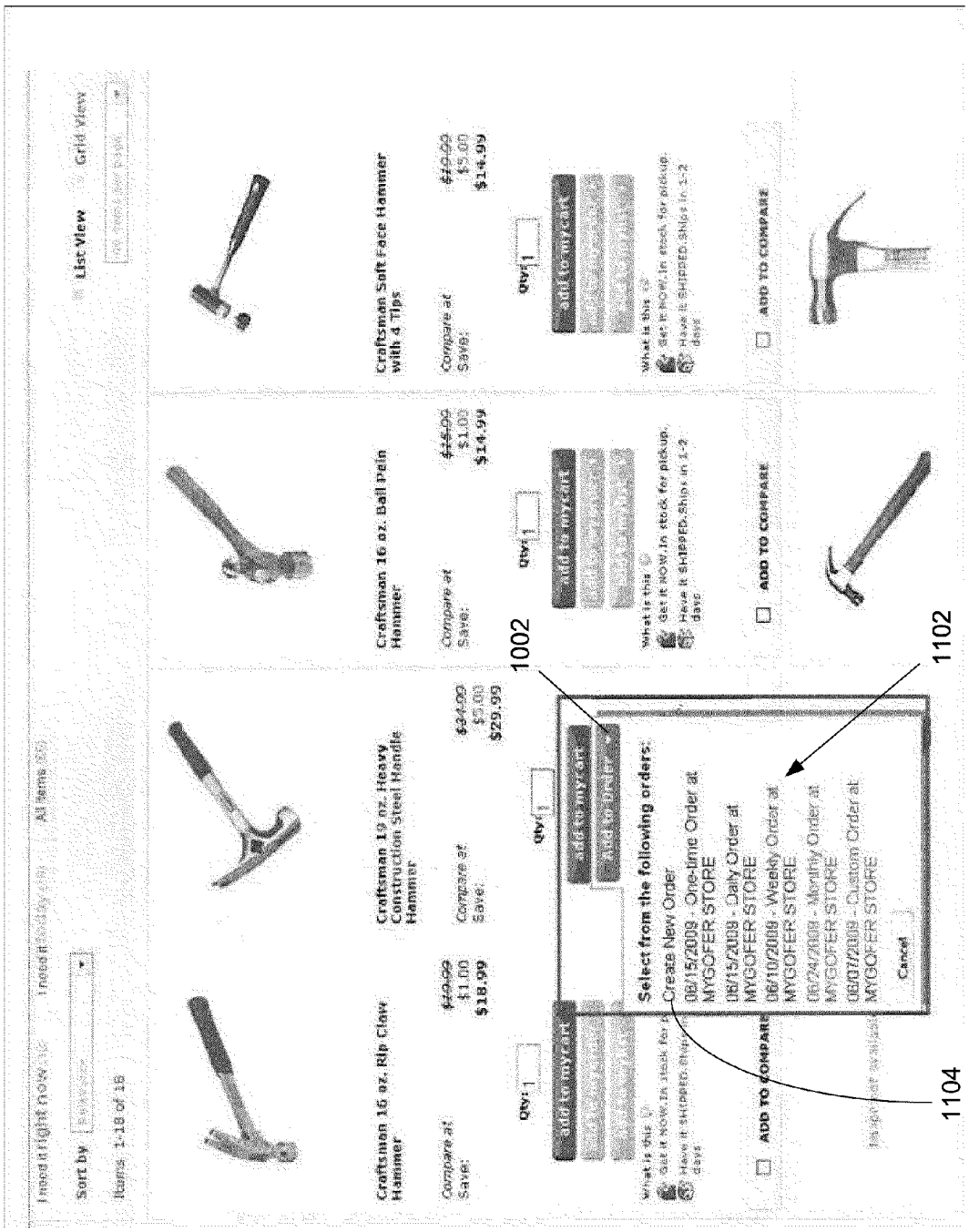
Figure 12:
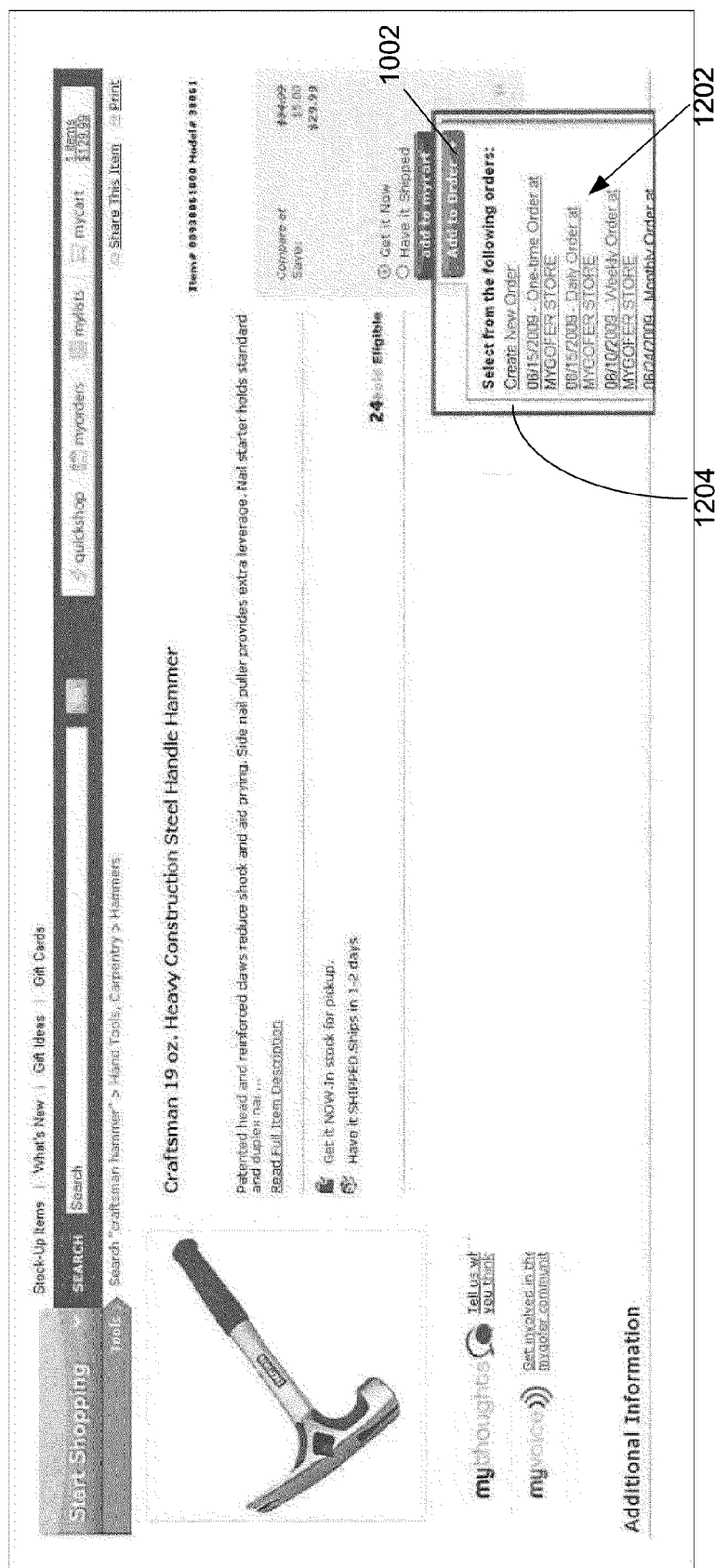
FIG. 12 illustrates an exemplary product detail page providing access to functionality for scheduling an order.

While the foregoing describes methods for scheduling an order via interactions with user interfaces that are made available to the user from various "order center" related pages, it is to be understood that scheduled orders may also be created (or items added to pre-existing scheduled orders) via interactions with a search results page, item details page, or the like. For example, FIG. 10 illustrates a display of a search results page for "hammers" which includes links 1002 by which a user can add a desired hammer to an order and informational window 1004 which informs a user if a particular item is available for immediate pickup. In this regard, as further seen in FIG. 11, upon a user selecting the "add to order link" 1002, the user is presented with a menu listing pre-existing orders 1102 to which the desired hammer may be added (by clicking on the desired link) as well as a link 1104 by which the desired hammer may be added to an order which is to be created/scheduled as described above. Similar user interface elements for adding a desired item to a pre-existing order 1202 or to a new order 1204 are illustrated in the product details page shown in FIG. 12. Accordingly, by these further examples, it is to be understood that the illustrative embodiments disclosed herein are not meant to be limiting and that various methods are available for allowing a user to schedule orders for pickup via a computer network.

Figure 14:
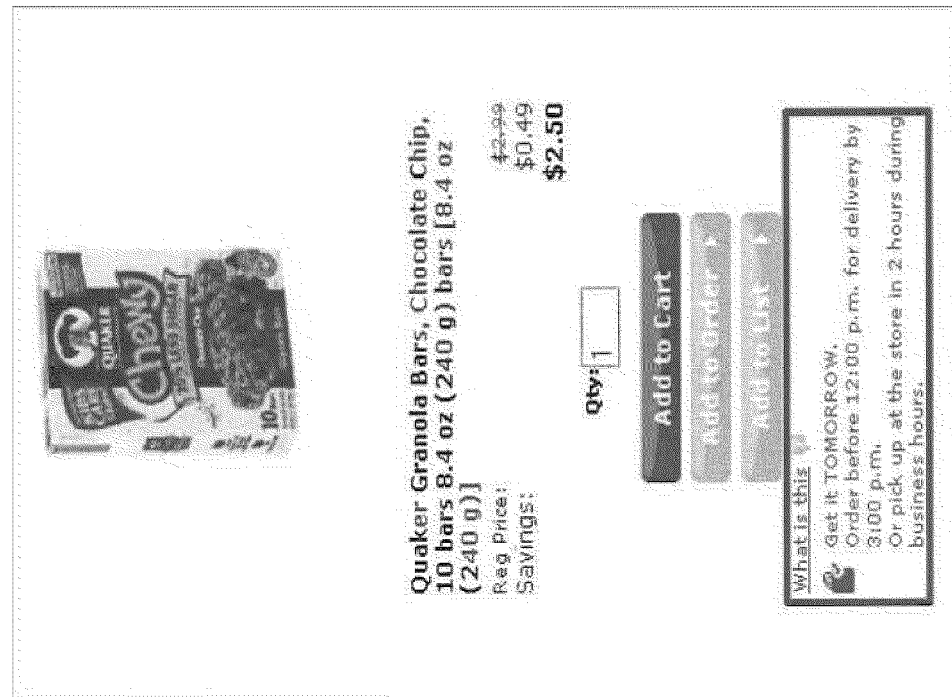
FIGS. 13 and 14 illustrate exemplary product pages that provide pickup availability information of a product.
Figure 13:
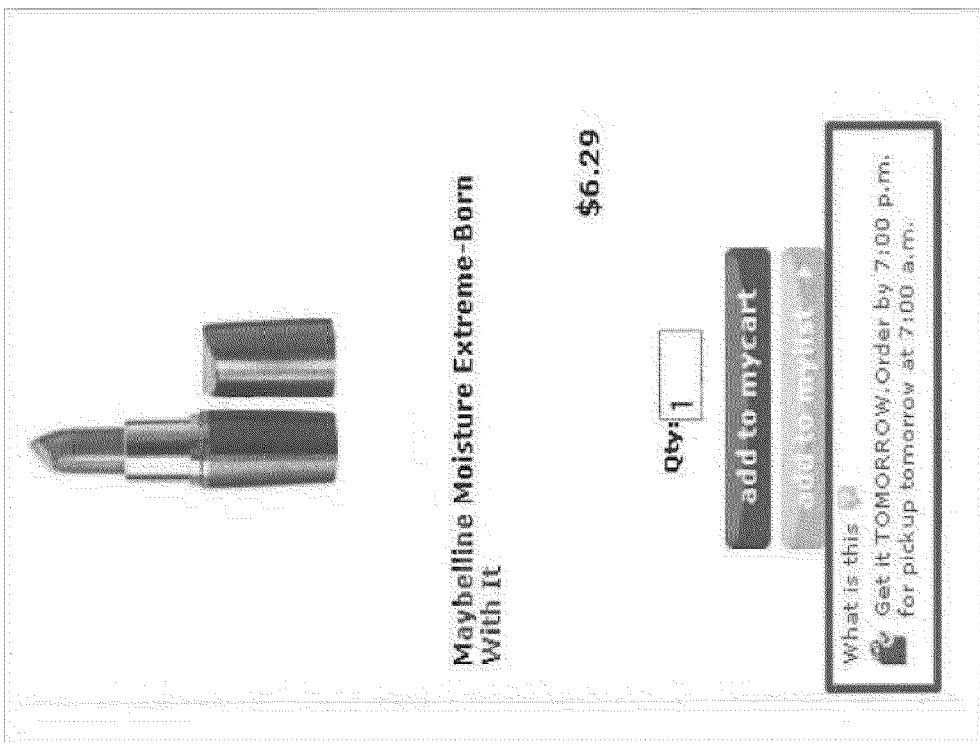

In addition to providing user interfaces that allow a user to create and otherwise manage scheduled orders, the subject system and method further functions to make available to a user information that will allow the user to make informed decisions regarding ordered item pickup and/or delivery. By way of example, FIGS. 13 and 14 illustrate product detail pages which include availability information for the corresponding product. In this regard, as noted above, the system will determine the availability of an item by accessing real-time information concerning availability/stocking locations of the product. Thus, in the example illustrated in FIG. 13, based upon the availability and stocking location information for the shown product, the system informs the user that, if the user orders the product by 7:00 pm (the order cut-off time), the product will be available for pick-up by the user at the desired location at 7:00 am the next day (the pick-up start time). As further shown in FIG. 13, the information "order by Z for pickup by Y" is also displayed with a call to action, e.g., "Get it TOMORROW." In the example illustrated in FIG. 14, based upon the availability and stocking location information for the shown product, the system informs the user that, if the product is order by 12:00 pm, it can be delivered by 3:00 pm the next day or, if ordered now, the product can be picked up at the store in 2 hours time.

It will be further appreciated that, in certain circumstances, various items within an individual order may have different times at which they may become available for pickup. In such a case, the system may allow a user to request that one or more of the items in an order be made available for pick up as soon as they become available. By way of example only, considering an order having items A and B, the system can inform the user that item A can be picked up at the store in 2 hours time while item B can be picked up at the store in 4 hours time with the user being given the option to request that the items be made individually available for pickup in 2 hours time and 4 hours time, respectively, or request that the items be packaged together for pickup in 4 hours time.

From the foregoing, it will be appreciated that the system may present to a user informational messages in the generic forms of:

1) If ordered now, the order can be picked up at time Y (where the time Y is based on the current time plus the longest item lead time—considering pickup location operating hours if applicable);

2) If ordered now, the order can be picked up in X hours (where the amount of time X is based on the longest item lead time—considering pickup location operating hours if applicable);

3) If ordered now, the entire order can be picked up at a time Y/in X hours (determined as above) or, if desired, (for each item or group of items in the order) item A or group of items A can be picked up at a time Y/in X hours (determined as above);

4) If ordered by time Z, the order can be picked up at time Y1 (where the time Y1 is based on the time Z plus the longest item lead time—considering pickup location operating hours if applicable); and 5) If ordered by time Z, the entire order can be picked up at a time Y1/in X hours (determined as above) or, if desired, (for each item or group of items in the order) item A or group of items A can be picked up at a time Y1/in X hours (determined as above). It is to be understood that these exemplary generic form informational messages are not intended to be limiting.

Figure 20:
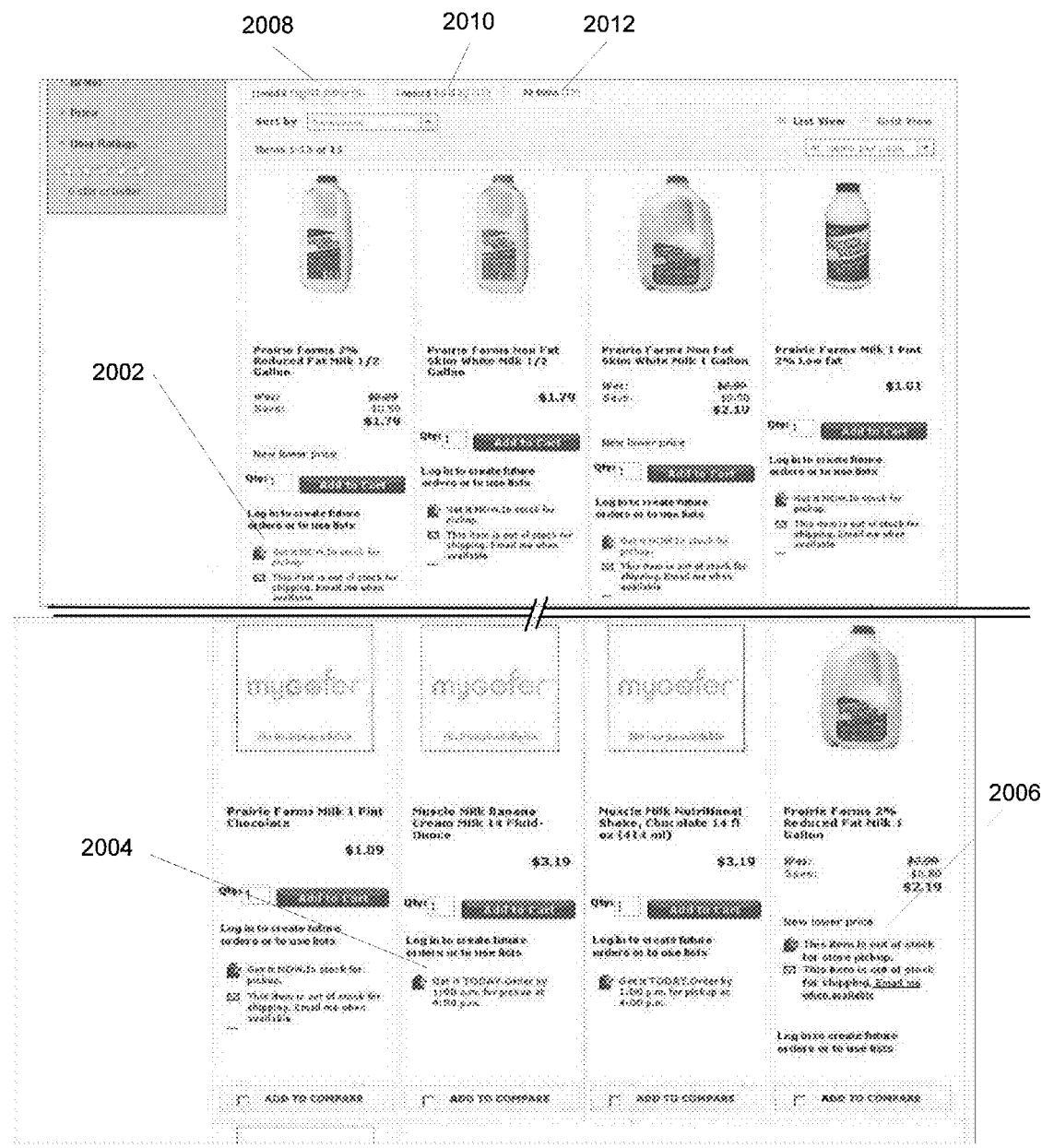
FIG. 20 illustrated an exemplary, ordered search results page.

Considering now FIG. 20, when a user searches for items of interest, the system may additionally use the real-time availability and stocking location information to influence the relevancy, e.g., sort order, of search results that are displayed to the user in a search results page. For example, items that are currently in stock and available for immediate pickup (if any) would be presented first or at the top of the search results, e.g., item 2002, with items that are in stock and available for same day pickup at a later time (if any) presented next within the search results, e.g., item 2004, with items currently out of stock (if any) presented last within the search results, e.g., item 2006. In the example illustrated in FIG. 20, the user is also provided with the ability to filter the search results by activating tabs 2008, 2010, and 2012, e.g., to cause the display of only those items meeting the search criteria that are available right now, only those items meeting the search criteria that available today (e.g., right now and later in the day), and to display all items meeting the search criteria, respectively. As further illustrated, within the tabs the user may also be presented with the number of items that meet each availability status.

As noted above, the subject system and method additionally provides the ability for a customer to order items online and request that the items be held for pickup with the added feature that the customer can delay payment for the items until such time as the customer actually picks up the items. The ability to request hold for an item and delay payment can be limited to items that are in-store and in-stock and the hold can be for a limited period of time, e.g., 24 hours, after which time the item reservation would be canceled with the items again being made available for purchase by others.

Figure 15:
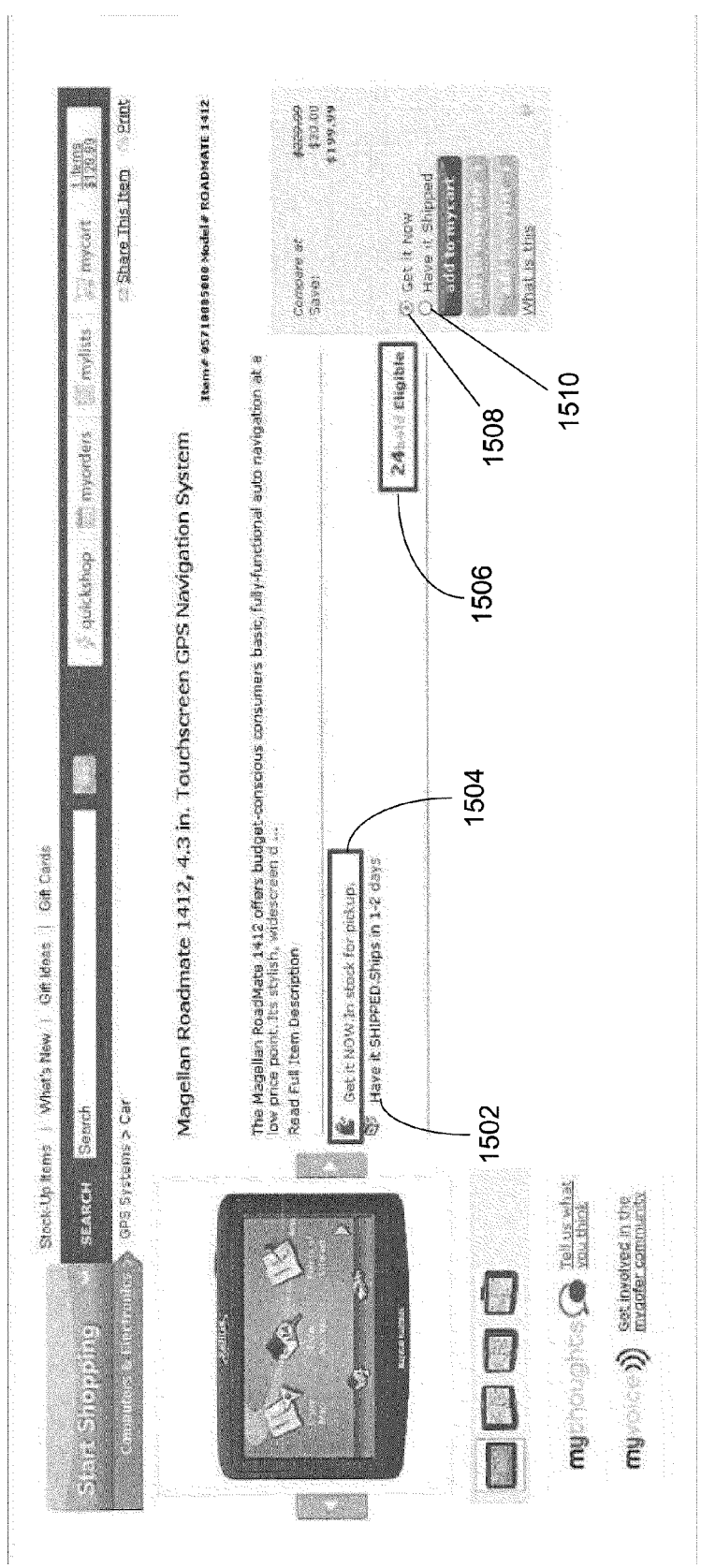
FIG. 15 illustrates an exemplary product detail page providing access to product holding functionality.
Figure 16:
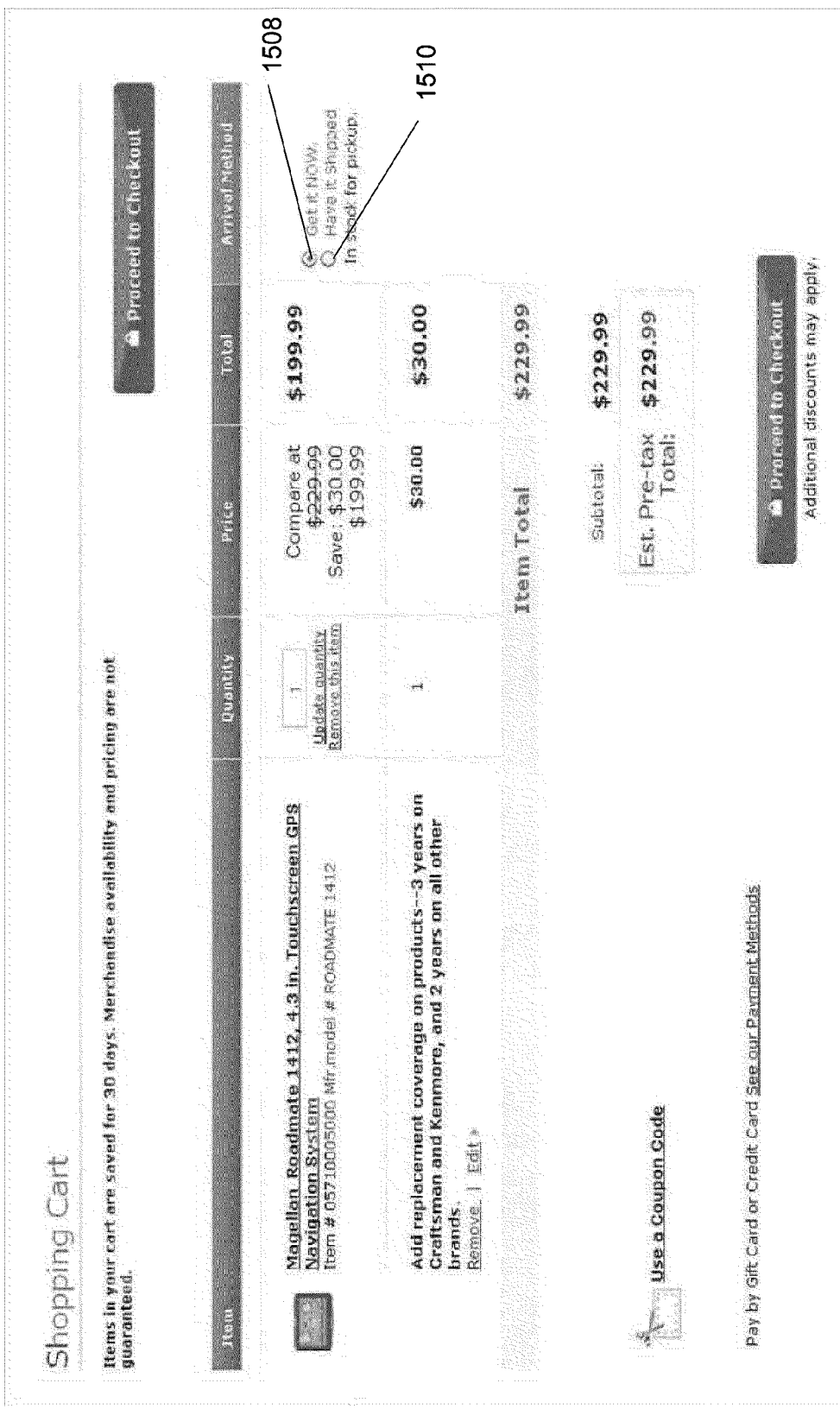
FIG. 16 illustrates an exemplary shopping cart page providing access to product holding functionality.

Turning now to FIGS. 15-19, an exemplary method by which item hold requests are handled by the system is now described. In this example, FIG. 15 illustrates an item detail page which informs the user that: a) the item can be ordered and scheduled for pickup 1502; b) the item can be ordered and scheduled for shipment 1504; and c) the item is available to be reserved on hold 1506. The item detail page thus provides user interface elements 1508 and 1510 by which the user can indicate their desire to order the item with pickup or order the item with shipment, respectively, and a user interface element 1512 by which the user can add the item to their shopping cart as part of the ordering process. As illustrated in FIG. 16, after the item has been added to the shopping cart, the shopping cart page can also provide the user interface elements 1508 and 1510 to thereby allow the user to change a previously specified preference for the order or indicate the preference for the first time in the event that no indication was previously provided.

Figure 18:
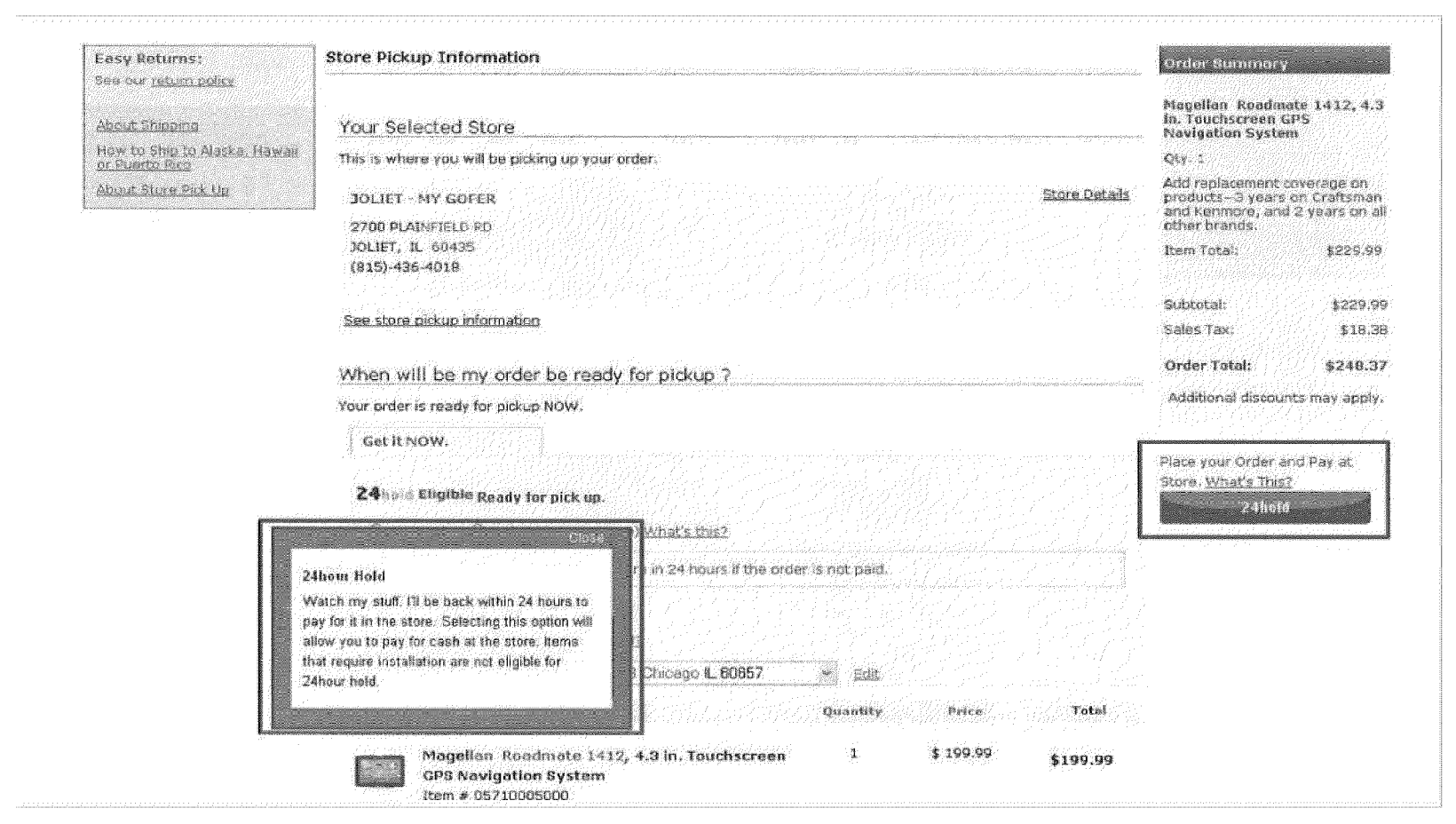
Figure 19:
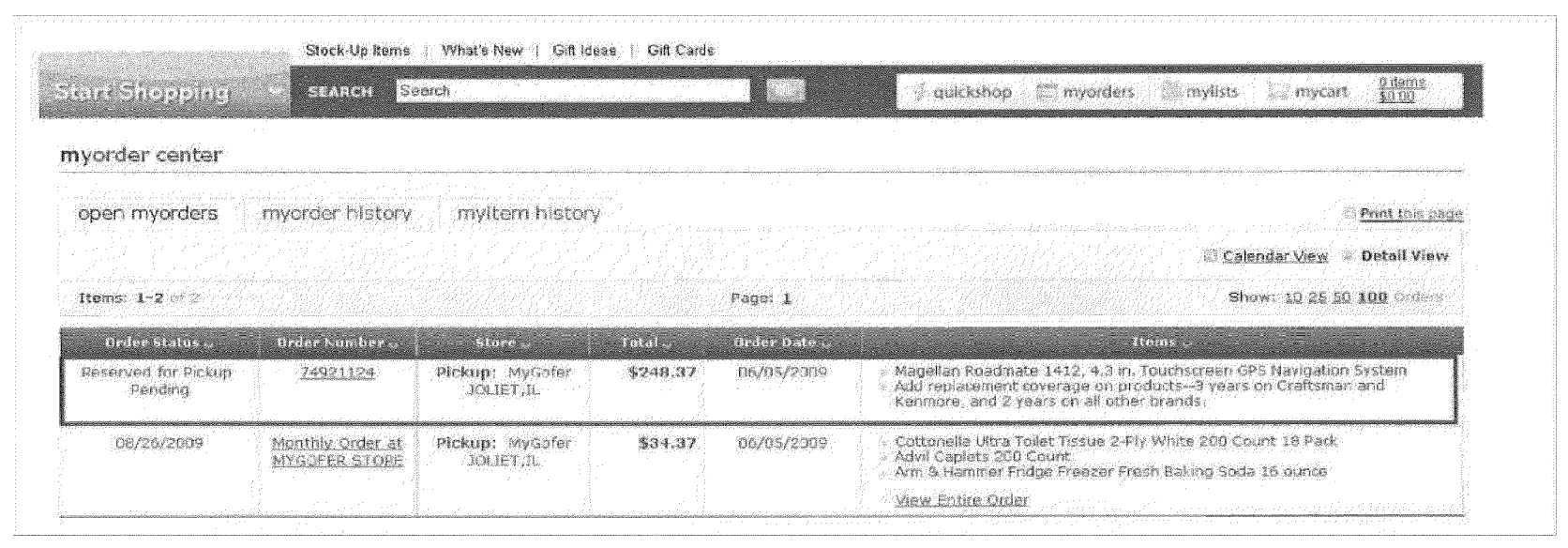

In the event that the user has elected to pickup the item, i.e., selected "Get it now," and has proceeded to checkout via interaction with user interface element 1602, the user will be presented with a store pickup page, an example of which is illustrated in FIG. 17. As illustrated, the store pickup page provides an order summary 1702, information concerning the store where the item is to be picked up 1704, information concerning when the order will be available for pickup 1706, and, if available, a notification that the item is eligible for reserve at the pickup location 1708 and a user interface element 1710 by which reserve can be selected. In connection with the reserve notification, the system may also provide a means, e.g., a "what's this" link, for the user to learn more about this option as illustrated in FIG. 18. If reserve is not selected, the user can elect to pay for the item at this time via user interface element 1712 whereupon the user will be taken to otherwise conventional payment processing pages. If, however, reserve is selected, the system will facilitate the placing of the item on hold for the customer, the customer will receive an order number for use in picking up the item at the store, and the open orders page for the customer will be updated to reflect the hold order as illustrated in FIG. 19.

As concerns a method by which ordered items can be collected by the user at the pickup location, the reader is referred to commonly assigned U.S. Pat. No. 6,439,345 which patent is incorporated herein by reference in its entirety. By way of example only and in keeping with the system and method disclosed in this patent, a kiosk can be provided at the pickup location by which the user can enter the order number that was provided to the user as a part of the ordering process, e.g., key it in, scan it in, etc. The kiosk can also be adapted to accept forms of payment, e.g., cash, credit, debit, etc., to thereby allow a user to make any payments that might be due, e.g., a 24 hour hold was requested for an ordered item. In response to the user providing the order number, a message would be sent to a stock room terminal for causing the desired item(s) to be drawn from stock and delivered to the user—whether in a pickup room, curbside, or the like. It will also be appreciated that some or all of the steps associated with fulfilling an order at a pickup location could also be performed manually.

While various concepts have been described in detail, it will be appreciated by those skilled in the art that various modifications and alternatives to those concepts could be developed in light of the overall teachings of the disclosure. Further, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A computer-readable non-transitory media stored thereon computer executable instructions, wherein the instructions perform steps for allowing a user to schedule pickup of an ordered item, the steps comprising:

providing a search results page which includes an item available for ordering;

providing a user interface comprising user interface elements for allowing a user to specify that an order which includes the item is it to be scheduled for pickup;

wherein the user interface comprises an indicator for informing a user of a time when at least the item in the order will be available for pickup;

wherein the time is determined considering real-time stocking information for the item; and wherein the real-time stocking information for the item is used to influence a position of the item within the search results page.

2. The computer-readable media as recited in claim 1 wherein the user interface is caused to be displayed via user interactions with a tool bar.

3. The computer-readable media as recited in claim 1, wherein the user interface is caused to be displayed via user interaction with a user interface element of the search results page.

4. The computer-readable media as recited in claim 1, wherein the user interface is caused to be displayed via user interaction with a user interface element of a product details page.

5. The computer-readable media as recited in claim 1, wherein items within a single order are available to be scheduled for pickup at different times.

6. The computer-readable media as recited in claim 1, wherein an item within an order can be held in reserve at the pickup location.

7. The computer-readable media as recited in claim 6, wherein payment for the item held in reserve need not be made until the item is picked up at the pickup location.

8. The computer-readable media as recited in claim 7, wherein the item is held in reserve for a predetermined period of time and then released for purchase by others.

* * * * *